US011262555B2

United States Patent
Yamazaki et al.

(10) Patent No.: US 11,262,555 B2
(45) Date of Patent: Mar. 1, 2022

(54) CAMERA OPTICAL LENS

(71) Applicant: AAC Optics Solutions Pte. Ltd., Singapore (SG)

(72) Inventors: Kaoru Yamazaki, Osaka (JP); Lei Zhang, Shenzhen (CN); Yuanshan Cui, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 51 days.

(21) Appl. No.: 16/992,104

(22) Filed: Aug. 13, 2020

(65) Prior Publication Data

US 2021/0389566 A1 Dec. 16, 2021

(30) Foreign Application Priority Data

Jun. 16, 2020 (CN) .......................... 202010545094.6

(51) Int. Cl.
*G02B 13/00* (2006.01)
*G02B 27/00* (2006.01)
(Continued)

(52) U.S. Cl.
CPC ........... *G02B 13/0045* (2013.01); *G02B 9/64* (2013.01); *G02B 27/0025* (2013.01); *G02B 3/04* (2013.01);
(Continued)

(58) Field of Classification Search
CPC .. G02B 13/0045; G02B 27/0025; G02B 9/64; G02B 13/18; G02B 5/005; G02B 3/04; G02B 13/002
(Continued)

(56) References Cited

U.S. PATENT DOCUMENTS 4,143,944 A * 3/1979 Takahashi .............. G02B 13/04
359/750
8,599,495 B1 * 12/2013 Tsai ....................... G02B 13/18
359/708
(Continued)

FOREIGN PATENT DOCUMENTS

CN 109828361 A 5/2019
CN 110749983 A 2/2020
(Continued)

*Primary Examiner* — Evelyn A Lester
(74) *Attorney, Agent, or Firm* — W&G Law Group

(57) ABSTRACT

Provided is a camera optical lens including, sequentially from an object side to an image side, first to seventh lenses. The camera optical lens satisfies following conditions: $20.00 \leq R7/d7 \leq 30.00$; $20.00 \leq v7-v5 \leq 30.00$; and $-12.00 \leq (R1-R2)/(R3-R4) \leq -1.00$, where v5 denotes an abbe number of the fifth lens; v7 denotes an abbe number of the seventh lens; R1 denotes a curvature radius of an object side surface of the first lens; R2 denotes a curvature radius of an image side surface of the first lens; R3 denotes a curvature radius of an object side surface of the second lens; R4 denotes a curvature radius of an image side surface of the second lens; R7 denotes a curvature radius of an object side surface of the fourth lens; and d7 denotes an on-axis thickness of the fourth lens. The camera optical lens can achieve high optical performance such as large-aperture, wide-angle and ultra-thin.

19 Claims, 9 Drawing Sheets

(51) Int. Cl.
  *G02B 9/64* (2006.01)
  *G02B 13/18* (2006.01)
  *G02B 5/00* (2006.01)
  *G02B 3/04* (2006.01)
(52) U.S. Cl.
  CPC ............ *G02B 5/005* (2013.01); *G02B 13/002* (2013.01); *G02B 13/18* (2013.01)
(58) Field of Classification Search
  USPC .................. 359/708, 713, 739, 740, 755
  See application file for complete search history.

(56) References Cited

U.S. PATENT DOCUMENTS

| | | | | |
|---|---|---|---|---|
| 2015/0042863 A1* | 2/2015 | Tsai | ................ | G02B 3/04 359/708 |
| 2015/0103414 A1* | 4/2015 | Baik | ................ | G02B 27/0025 359/708 |
| 2015/0198787 A1* | 7/2015 | Kubota | ................ | G02B 9/64 359/708 |
| 2015/0268448 A1* | 9/2015 | Kubota | ................ | G02B 13/0045 359/755 |
| 2015/0378131 A1* | 12/2015 | Tang | ................ | G02B 9/64 359/708 |
| 2016/0062086 A1* | 3/2016 | Tsai | ................ | G02B 9/64 359/708 |
| 2016/0124191 A1* | 5/2016 | Hashimoto | ........ | G02B 13/0045 359/708 |
| 2016/0131874 A1* | 5/2016 | Tang | ................ | G02B 13/0045 359/708 |
| 2016/0306140 A1* | 10/2016 | Chen | ................ | G02B 9/62 |
| 2017/0235109 A1* | 8/2017 | Shin | ................ | G02B 9/62 359/708 |
| 2017/0235110 A1* | 8/2017 | Chen | ................ | G02B 13/0045 359/708 |
| 2018/0188488 A1* | 7/2018 | Gong | ................ | G02B 13/0045 |
| 2018/0210168 A1 | 7/2018 | Kubota et al. | | |
| 2018/0364457 A1* | 12/2018 | Yao | ................ | G02B 9/64 |
| 2019/0025551 A1* | 1/2019 | Kuo | ................ | G02B 13/06 |
| 2019/0146184 A1* | 5/2019 | Xu | ................ | G02B 13/0045 359/755 |
| 2019/0204540 A1* | 7/2019 | Liao | ................ | G02B 9/64 |
| 2019/0204553 A1* | 7/2019 | Lian | ................ | G02B 3/04 |
| 2019/0204556 A1* | 7/2019 | Jhang | ................ | G02B 9/64 |
| 2019/0243106 A1* | 8/2019 | Xu | ................ | G02B 9/64 |
| 2020/0073085 A1* | 3/2020 | Huang | ................ | G02B 15/173 |
| 2020/0209560 A1* | 7/2020 | Zhao | ................ | G02B 9/64 |
| 2020/0285030 A1* | 9/2020 | Tang | ................ | G02B 9/64 |
| 2020/0363611 A1* | 11/2020 | Huang | ................ | G02B 13/0045 |
| 2020/0386972 A1* | 12/2020 | Chen | ................ | G02B 3/04 |
| 2021/0063696 A1* | 3/2021 | Kamada | ................ | G02B 27/0081 |
| 2021/0096326 A1* | 4/2021 | Lu | ................ | G02B 9/64 |
| 2021/0109316 A1* | 4/2021 | Jhang | ................ | G02B 13/0045 |
| 2021/0109319 A1* | 4/2021 | Jhang | ................ | G02B 9/64 |
| 2021/0109323 A1* | 4/2021 | Dai | ................ | G02B 9/64 |
| 2021/0132341 A1* | 5/2021 | Xiao | ................ | G02B 13/0045 |
| 2021/0149159 A1* | 5/2021 | Jhang | ................ | G02B 9/64 |
| 2021/0149160 A1* | 5/2021 | Dong | ................ | G02B 9/64 |
| 2021/0157101 A1* | 5/2021 | Yunbai | ................ | G02B 9/64 |
| 2021/0215907 A1* | 7/2021 | Hu | ................ | G02B 9/64 |
| 2021/0263275 A1* | 8/2021 | Yang | ................ | G02B 13/0045 |
| 2021/0263276 A1* | 8/2021 | Huang | ................ | G02B 27/0025 |
| 2021/0263282 A1* | 8/2021 | Zhou | ................ | G02B 27/0025 |
| 2021/0263288 A1* | 8/2021 | Huang | ................ | G02B 13/0015 |
| 2021/0278636 A1* | 9/2021 | Lin | ................ | G02B 13/02 |
| 2021/0286154 A1* | 9/2021 | Lian | ................ | G02B 13/0045 |
| 2021/0311289 A1* | 10/2021 | Nitta | ................ | G02B 13/0045 |

FOREIGN PATENT DOCUMENTS

| | | |
|---|---|---|
| CN | 110908075 A | 3/2020 |
| JP | 2016085431 A | 5/2016 |
| JP | 2019159298 A | 9/2019 |

* cited by examiner

CAMERA OPTICAL LENS

TECHNICAL FIELD

The present invention relates to the field of optical lens, and more particularly, to a camera optical lens suitable for handheld terminal devices, such as smart phones or digital cameras, and camera devices, such as monitors or PC lenses.

BACKGROUND

With the emergence of smart phones in recent years, the demand for miniature camera optical lens is increasingly higher, but in general the photosensitive devices of camera optical lens are nothing more than Charge Coupled Devices (CCDs) or Complementary Metal-Oxide Semiconductor Sensors (CMOS sensors). As the progress of the semiconductor manufacturing technology makes the pixel size of the photosensitive devices become smaller, plus the current development trend of electronic products towards better functions and thinner and smaller dimensions, miniature camera optical lenses with good imaging quality have become a mainstream in the market.

In order to obtain better imaging quality, the lens that is traditionally equipped in mobile phone cameras adopts a three-piece, four-piece lens or even five-piece or six-piece structure. Also, with the development of technology and the increase of the diverse demands of users, and as the pixel area of photosensitive devices is becoming smaller and smaller and the requirement of the system on the imaging quality becoming increasingly higher, a seven-piece lens structure gradually emerges in lens designs. Although the common seven-piece lens has good optical performance, its refractive power, lens spacing and lens shape settings still have some irrationality, such that the lens structure cannot achieve high optical performance while satisfying design requirements for ultra-thin, wide-angle lenses having large apertures.

SUMMARY

In view of the problems, the present invention aims to provide a camera optical lens, which can achieve high imaging performance while satisfying design requirements for ultra-thin, wide-angle lenses having large apertures.

In an embodiment, the present invention provides a camera optical lens. The camera optical lens includes, sequentially from an object side to an image side: a first lens having a positive refractive power; a second lens having a negative refractive power; a third lens having a negative refractive power; a fourth lens having a positive refractive power; a fifth lens having a negative refractive power; a sixth lens having a positive refractive power; and a seventh lens having a negative refractive power. The camera optical lens satisfies following conditions: $20.00 \leq R7/d7 \leq 30.00$; $20.00 \leq v7-v5 \leq 30.00$; and $-12.00 \leq (R1-R2)/(R3-R4) \leq -1.00$, where v5 denotes an abbe number of the fifth lens; v7 denotes an abbe number of the seventh lens; R1 denotes a curvature radius of an object side surface of the first lens; R2 denotes a curvature radius of an image side surface of the first lens; R3 denotes a curvature radius of an object side surface of the second lens; R4 denotes a curvature radius of an image side surface of the second lens; R7 denotes a curvature radius of an object side surface of the fourth lens; and d7 denotes an on-axis thickness of the fourth lens.

As an improvement, the object side surface of the first lens is convex in a paraxial region, and the image side surface of the first lens is concave in the paraxial region. The camera optical lens satisfies following conditions: $0.48 \leq f1/f \leq 1.61$; $-3.43 \leq (R1+R2)/(R1-R2) \leq -1.01$; and $0.07 \leq d1/TTL \leq 0.22$, where f denotes a focal length of the camera optical lens; f1 denotes a focal length of the first lens; d1 denotes an on-axis thickness of the first lens; and TTL denotes a total optical length from the object side surface of the first lens to an image plane of the camera optical lens along an optic axis.

As an improvement, the camera optical lens further satisfies following conditions: $0.77 \leq f1/f \leq 1.29$; $-2.14 \leq (R1+R2)/(R1-R2) \leq -1.26$; and $0.11 \leq d1/TTL \leq 0.17$.

As an improvement, the object side surface of the second lens is convex in a paraxial region, and the image side surface of the second lens is concave in the paraxial region. The camera optical lens satisfies following conditions: $-7.03 \leq f2/f \leq -1.50$; $1.09 \leq (R3+R4)/(R3-R4) \leq 10.69$; and $0.02 \leq d3/TTL \leq 0.05$, where f denotes a focal length of the camera optical lens; f2 denotes a focal length of the second lens; d3 denotes an on-axis thickness of the second lens; and TTL denotes a total optical length from the object side surface of the first lens to an image plane of the camera optical lens along an optic axis.

As an improvement, the camera optical lens further satisfies following conditions: $-4.39 \leq f2/f \leq -1.87$; $1.74 \leq (R3+R4)/(R3-R4) \leq 8.55$; and $0.03 \leq d3/TTL \leq 0.04$.

As an improvement, the third lens includes an image side surface being concave in a paraxial region. The camera optical lens satisfies following conditions: $-8.28 \leq f3/f \leq -1.95$; $0.46 \leq (R5+R6)/(R5-R6) \leq 4.16$; and $0.02 \leq d5/TTL \leq 0.08$, where f denotes a focal length of the camera optical lens; f3 denotes a focal length of the third lens; and R5 denotes a curvature radius of an object side surface of the third lens; R6 denotes a curvature radius of the image side surface of the third lens; d5 denotes an on-axis thickness of the third lens; and TTL denotes a total optical length from the object side surface of the first lens to an image plane of the camera optical lens along an optic axis.

As an improvement, the camera optical lens further satisfies following conditions: $-5.18 \leq f3/f \leq -2.44$; $0.74 \leq (R5+R6)/(R5-R6) \leq 3.33$; and $0.04 \leq d5/TTL \leq 0.07$.

As an improvement, the object side surface of the fourth lens is convex in a paraxial region, and the fourth lens further includes an image side surface being convex in the paraxial region. The camera optical lens satisfies following conditions: $1.28 \leq f4/f \leq 4.26$; $-0.08 \leq (R7+R8)/(R7-R8) \leq 0.41$; and $0.05 \leq d7/TTL \leq 0.17$, where f denotes a focal length of the camera optical lens; f4 denotes a focal length of the fourth lens; R8 denotes a curvature radius of the image side surface of the fourth lens; and TTL denotes a total optical length from the object side surface of the first lens to an image plane of the camera optical lens along an optic axis.

As an improvement, the camera optical lens further satisfies following conditions: $2.00 \leq f4/f \leq 3.41$; $-0.05 \leq (R7+R8)/(R7-R8) \leq 0.35$; and $0.08 \leq d7/TTL \leq 0.13$.

As an improvement, the fifth lens includes an object side surface being convex in a paraxial region and an image side surface being concave in the paraxial region. The camera optical lens satisfies following conditions: $-25.17 \leq f5/f \leq -3.00$; $1.00 \leq (R9+R10)/(R9-R10) \leq 13.51$; and $0.03 \leq d9/TTL \leq 0.10$, where f denotes a focal length of the camera optical lens; f5 denotes a focal length of the fifth lens; R9 denotes a curvature radius of the object side surface of the fifth lens; R10 denotes a curvature radius of the image side surface of the fifth lens; d9 denotes an on-axis thickness of the fifth lens; and TTL denotes a total optical length from the object side surface of the first lens to an image plane of the camera optical lens along an optic axis.

As an improvement, the camera optical lens further satisfies following conditions: $-15.73 \leq f5/f \leq -3.50$; $2.00 \leq (R9+R10)/(R9-R10) \leq 10.80$; and $0.04 \leq d9/TTL \leq 0.08$.

As an improvement, the sixth lens includes an object side surface being convex in a paraxial region and an image side surface being concave in the paraxial region. The camera optical lens satisfies following conditions: $0.49 \leq f6/f \leq 1.58$; $-4.18 \leq (R11+R12)/(R11-R12) \leq -1.11$; and $0.03 \leq d11/TTL \leq 0.11$, where f denotes a focal length of the camera optical lens; f6 denotes a focal length of the sixth lens; R11 denotes a curvature radius of the object side surface of the sixth lens; R12 denotes a curvature radius of the image side surface of the sixth lens; d11 denotes an on-axis thickness of the sixth lens; and TTL denotes a total optical length from the object side surface of the first lens to an image plane of the camera optical lens along an optic axis.

As an improvement, the camera optical lens further satisfies following conditions: $0.78 \leq f6/f \leq 1.27$; $-3.00 \leq (R11+R12)/(R11-R12) \leq -1.38$; and $0.05 \leq d11/TTL \leq 0.09$.

As an improvement, the seventh lens includes an object side surface being concave in a paraxial region and an image side surface being concave in the paraxial region. The camera optical lens satisfies following conditions: $-1.60 \leq f7/f \leq -0.49$; $0.08 \leq (R13+R14)/(R13-R14) \leq 0.75$; and $0.03 \leq d13/TTL \leq 0.13$, where f denotes a focal length of the camera optical lens; f7 denotes a focal length of the seventh lens; R13 denotes a curvature radius of the object side surface of the seventh lens; R14 denotes a curvature radius of the image side surface of the seventh lens; d13 denotes an on-axis thickness of the seventh lens; and TTL denotes a total optical length from the object side surface of the first lens to an image plane of the camera optical lens along an optic axis.

As an improvement, the camera optical lens further satisfies following conditions: $-1.00 \leq f7/f \leq -0.61$; $0.10 \leq (R13+R14)/(R13-R14) \leq 0.60$; and $0.05 \leq d13/TTL \leq 0.10$.

As an improvement, an F number of the camera optical lens is smaller than or equal to 1.70.

As an improvement, the F number of the camera optical lens is smaller than or equal to 1.65.

As an improvement, a total optical length TTL from the object side surface of the first lens to an image plane of the camera optical lens along an optic axis is smaller than or equal to 7.87 mm.

As an improvement, the total optical length TTL is smaller than or equal to 7.51 mm.

The present invention has advantageous effects in that the camera optical lens according to the present invention has excellent optical performance and is ultra-thin, wide-angle and has a large aperture, making it especially suitable for high-pixel camera optical lens assembly of mobile phones and WEB camera optical lenses formed by camera elements such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figure and the embodiments. It should be understood the specific embodiments described hereby is only to explain the disclosure, not intended to limit the disclosure.

Embodiment 1

Figure 1:
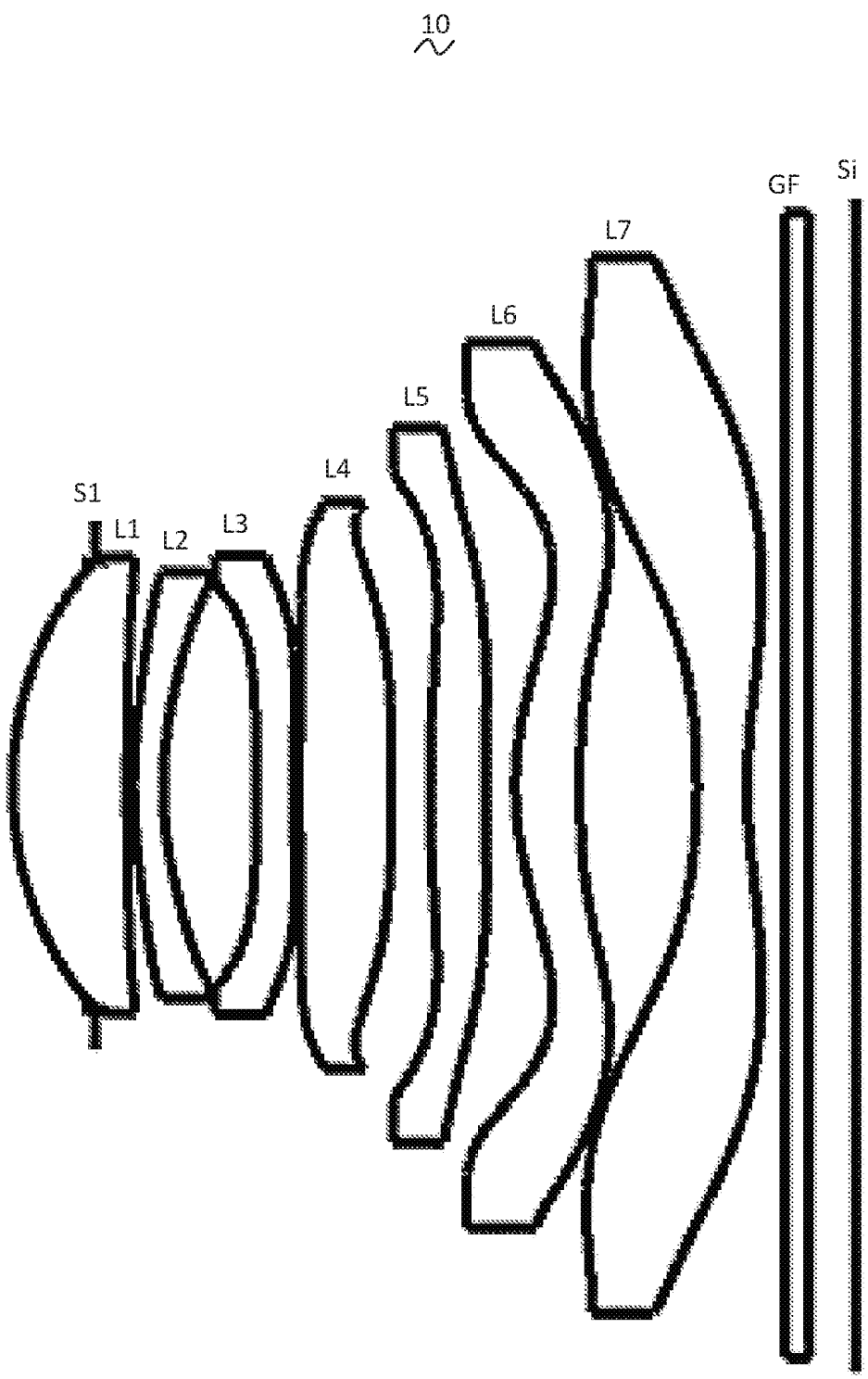
FIG. 1 is a schematic diagram of a structure of a camera optical lens in accordance with Embodiment 1 of the present invention.

Referring to FIG. 1, the present invention provides a camera optical lens 10. FIG. 1 shows the camera optical lens 10 according to Embodiment 1 of the present invention. The camera optical lens 10 includes seven lenses. Specifically, the camera optical lens 10 includes, sequentially from an object side to an image side, an aperture S1, a first lens L1, a second lens L2, a third lens L3, a fourth lens L4, a fifth lens L5, a sixth lens L6, and a seventh lens L7. A glass plate GF can be arranged between the seventh lens L7 and an image plane Si. The glass plate GF may be a glass cover, or an optical filter.

The first lens L1 has a positive refractive power, the second lens L2 has a negative refractive power, the third lens L3 has a negative refractive power, the fourth lens L4 has a positive refractive power, the fifth lens L5 has a negative refractive power, the sixth lens L6 has a positive refractive power, and the seventh lens L7 has a negative refractive power.

The first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, and the seventh lens L7 is made of a plastic material. In other embodiments, the lenses may be made of other material.

Herein, an abbe number of the fifth lens L5 is defined as v5, an abbe number of the seventh lens L7 is defined as v7, a curvature radius of an object side surface of the first lens L1 is defined as R1, a curvature radius of an image side surface of the first lens L1 is defined as R2, a curvature radius of an object side surface of the second lens L2 is defined as R3, a curvature radius of an image side surface of the second lens L2 is defined as R4, a curvature radius of an object side surface of the fourth lens L4 is defined as R7, and an on-axis thickness of the fourth lens L4 is defined as d7. The camera optical lens 10 should satisfy the following conditions:

$$20.00 \leq R7/d7 \leq 30.00 \quad (1);$$

$$20.00 \leq v7-v5 \leq 30.00 \quad (2); \text{ and}$$

$$-12.00 \leq (R1-R2)/(R3-R4) \leq -1.00 \quad (3).$$

The condition (1) specifies a ratio of the curvature radius R7 of the object side surface of the fourth lens L4 to the on-axis thickness d7 of the fourth lens L4. By controlling the refractive power of the fourth lens L4 within the reasonable range, correction of aberrations of the optical system can be facilitated.

The condition (2) specifies a difference between a dispersion coefficient of the seventh lens L7 and a dispersion coefficient of the fifth lens L5. When the condition is satisfied, the dispersion of the camera optical lens 10 can be effectively corrected, the definition of the camera can be improved so as to capture an image closer to a true color of a subject, thereby improving the imaging quality.

When the condition (3) is satisfied, the vulnerability of the camera optical lens to an eccentricity of the second lens L2 can be reduced.

In an embodiment, an object side surface of the first lens L1 is convex in a paraxial region and an image side surface of the first lens L1 is concave in the paraxial region.

A focal length of the camera optical lens 10 is defined as f, and a focal length of the first lens L1 is defined as f1. The camera optical lens 10 should satisfy a condition of $0.48 \leq f1/f \leq 1.61$, which specifies a ratio of the focal length f1 of the first lens L1 to the focal length f of the camera optical lens 10. When the condition is satisfied, the first lens L1 can have an appropriate positive refractive power, thereby facilitating reducing aberrations of the system while facilitating development towards ultra-thin, wide-angle lenses. As an example, $0.77 \leq f1/f \leq 1.29$.

A curvature radius of the object side surface of the first lens L1 is defined as R1, and a curvature radius of the image side surface of the first lens L1 is defined as R2. The camera optical lens 10 should satisfy a condition of $-3.43 \leq (R1+R2)/(R1-R2) \leq -1.01$. By reasonably controlling a shape of the first lens L1, the first lens L1 can effectively correct spherical aberrations of the system. As an example, $-2.14 \leq (R1+R2)/(R1-R2) \leq -1.26$.

An on-axis thickness of the first lens L1 is defined as d1, and a total optical length from the object side surface of the first lens L1 to an image plane of the camera optical lens 10 along an optic axis is defined as TTL. The camera optical lens 10 should satisfy a condition of $0.07 \leq d1/TTL \leq 0.22$. This can facilitate achieving ultra-thin lenses. As an example, $0.11 \leq d1/TTL \leq 0.17$.

In an embodiment, an object side surface of the second lens L2 is convex in a paraxial region and an image side surface of the second lens L2 is concave in the paraxial region.

The focal length of the camera optical lens 10 is f, and a focal length of the second lens L2 is f2. The camera optical lens 10 further satisfies a condition of $-7.03 \leq f2/f \leq -1.50$. By controlling the negative refractive power of the second lens L2 within the reasonable range, correction of aberrations of the optical system can be facilitated. As an example, $-4.39 \leq f2/f \leq -1.87$.

A curvature radius of the object side surface of the second lens L2 is defined as R3, and a curvature radius of the image side surface of the second lens L2 is defined as R4. The camera optical lens 10 should satisfy a condition of $1.09 \leq (R3+R4)/(R3-R4) \leq 10.69$, which specifies a shape of the second lens L2. This can facilitate correction of an on-axis aberration with development towards ultra-thin, wide-angle lenses. As an example, $1.74 \leq (R3+R4)/(R3-R4) \leq 8.55$.

The total optical length from the object side surface of the first lens L1 to the image plane of the camera optical lens 10 along the optic axis is defined as TTL, and an on-axis thickness of the second lens L2 is defined as d3. The camera optical lens 10 should satisfy a condition of $0.02 \leq d3/TTL \leq 0.05$. This can facilitate achieving ultra-thin lenses. As an example, $0.03 \leq d3/TTL \leq 0.04$.

In an embodiment, an object side surface of the third lens L3 is concave in the paraxial region and an image side surface of the third lens L3 is concave in the paraxial region.

The focal length of the camera optical lens 10 is f, and a focal length of the third lens L3 is f3. The camera optical lens 10 further satisfies a condition of $-8.28 \leq f3/f \leq -1.95$. The appropriate distribution of the refractive power of the third lens L3 leads to better imaging quality and a lower sensitivity. As an example, $-5.18 \leq f3/f \leq -2.44$.

A curvature radius of the object side surface of the third lens L3 is defined as R5, and a curvature radius of the image side surface of the third lens L3 is defined as R6. The camera optical lens 10 should satisfy a condition of $0.46 \leq (R5+R6)/(R5-R6) \leq 4.16$. This specifies a shape of the third lens L3. When the condition is satisfied, the deflection of light passing through the lens can be alleviated, and aberrations can be effectively reduced. As an example, $0.74 \leq (R5+R6)/(R5-R6) \leq 3.33$.

The total optical length from the object side surface of the first lens L1 to the image plane of the camera optical lens 10 along the optic axis is defined as TTL, and an on-axis thickness of the third lens L3 is defined as d5. The camera optical lens 10 should satisfy a condition of $0.02 \leq d5/TTL \leq 0.08$. This can facilitate achieving ultra-thin lenses. As an example, $0.04 \leq d5/TTL \leq 0.07$.

An object side surface of the fourth lens L4 is convex in a paraxial region and an image side surface of the fourth lens L4 is convex in the paraxial region.

The focal length of the camera optical lens 10 is f, and a focal length of the fourth lens L4 is f4. The camera optical lens 10 further satisfies a condition of $1.28 \leq f4/f \leq 4.26$, which specifies a ratio of the focal length of the fourth lens L4 to the focal length of the camera optical lens. The appropriate distribution of the refractive power of the fourth lens L4 leads to better imaging quality and a lower sensitivity. As an example, $2.00 \leq f4/f \leq 3.41$.

A curvature radius of the object side surface of the fourth lens L4 is defined as R7, and a curvature radius of the image side surface of the fourth lens L4 is defined as R8. The camera optical lens 10 should satisfy a condition of $-0.08 \leq (R7+R8)/(R7-R8) \leq 0.41$, which specifies a shape of the fourth lens L4. This can facilitate correction of an off-axis aberration with development towards ultra-thin, wide-angle lenses. As an example, $-0.05 \leq (R7+R8)/(R7-R8) \leq 0.35$.

The total optical length from the object side surface of the first lens L1 to the image plane of the camera optical lens 10 along the optic axis is defined as TTL, and an on-axis thickness of the fourth lens L4 is defined as d7. The camera optical lens 10 should satisfy a condition of 0.05≤d7/TTL≤0.17. This can facilitate achieving ultra-thin lenses. As an example, 0.08≤d7/TTL≤0.13.

In an embodiment, the object side surface of the fifth lens L5 is convex in a paraxial region, and an image side surface of the fifth lens L5 is concave in the paraxial region.

The focal length of the camera optical lens 10 is f, and the focal length of the fifth lens L5 is f5. The camera optical lens 10 further satisfies a condition of −25.17≤f5/f≤−3.00. This condition for the fifth lens L5 can effectively make a light angle of the camera optical lens 10 gentle and reduce the tolerance sensitivity. As an example, −15.73≤f5/f≤−3.50.

A curvature radius of the object side surface of the fifth lens L5 is defined as R9, and a curvature radius of the image side surface of the fifth lens L5 is defined as R10. The camera optical lens 10 should satisfy a condition of 1.00≤(R9+R10)/(R9−R10)≤13.51, which specifies a shape of the fifth lens L5. This can facilitate correction of an off-axis aberration with development towards ultra-thin, wide-angle lenses. As an example, 2.00≤(R9+R10)/(R9−R10)≤10.80.

The total optical length from the object side surface of the first lens L1 to the image plane of the camera optical lens 10 along the optic axis is defined as TTL, and an on-axis thickness of the fifth lens L5 is defined as d9. The camera optical lens 10 should satisfy a condition of 0.03≤d9/TTL≤0.10. This can facilitate achieving ultra-thin lenses. As an example, 0.04≤d9/TTL≤0.08.

In an embodiment, the sixth lens L6 includes an object side surface being convex in a paraxial region and an image side surface being concave in the paraxial region.

The focal length of the camera optical lens 10 is f, and the focal length of the sixth lens L6 is f6. The camera optical lens 10 further satisfies a condition of 0.49≤f6/f≤1.58. The appropriate distribution of the refractive power leads to better imaging quality and a lower sensitivity. As an example, 0.78≤f6/f≤1.27.

A curvature radius of the object side surface of the sixth lens L6 is defined as R11, and a curvature radius of the image side surface of the sixth lens L6 is defined as R12. The camera optical lens 10 should satisfy a condition of −4.18≤(R11+R12)/(R11−R12)≤−1.11, which specifies a shape of the sixth lens L6. This can facilitate correction of an off-axis aberration with development towards ultra-thin, wide-angle lenses. As an example, −3.00≤(R11+R12)/(R11−R12)≤−1.38.

The total optical length from the object side surface of the first lens L1 to the image plane of the camera optical lens 10 along the optic axis is defined as TTL, and an on-axis thickness of the sixth lens L6 is defined as d11. The camera optical lens 10 should satisfy a condition of 0.03≤d11/TTL≤0.11. This can facilitate achieving ultra-thin lenses. As an example, 0.05≤d11/TTL≤0.09.

In an embodiment, the object side surface of the seventh lens L7 is concave in a paraxial region, and the image side surface the seventh lens L7 is concave in the paraxial region.

The focal length of the camera optical lens 10 is f, and the focal length of the seventh lens L7 is f7. The camera optical lens 10 further satisfies a condition of −1.60≤f7/f≤−0.49. The appropriate distribution of the refractive power of the seventh lens L7 leads to better imaging quality and a lower sensitivity. As an example, −1.00≤f7/f≤−0.61.

A curvature radius of the object side surface of the seventh lens L7 is defined as R13, and a curvature radius of the image side surface of the seventh lens L7 is defined as R14. The camera optical lens 10 further satisfies a condition of 0.08≤(R13+R14)/(R13−R14)≤0.75, which specifies a shape of the seventh lens L7. This can facilitate correction of an off-axis aberration with development towards ultra-thin, wide-angle lenses. As an example, 0.10≤(R13+R14)/(R13−R14)≤0.60.

The total optical length from the object side surface of the first lens L1 to the image plane of the camera optical lens 10 along the optic axis is defined as TTL, and an on-axis thickness of the seventh lens L7 is defined as d13. The camera optical lens 10 should satisfy a condition of 0.03≤d13/TTL≤0.13. This can facilitate achieving ultra-thin lenses. As an example, 0.05≤d13/TTL≤0.10.

In this embodiment, the total optical length TTL of the camera optical lens 10 is smaller than or equal to 7.87 mm, which is beneficial for achieving ultra-thin lenses. As an example, the total optical length TTL of the camera optical lens 10 is smaller than or equal to 7.51 mm.

In this embodiment, an F number of the camera optical lens 10 is smaller than or equal to 1.70. The camera optical lens 10 has a large aperture and better imaging performance. As an example, the F number of the camera optical lens 10 is smaller than or equal to 1.65.

With such design, the total optical length TTL of the camera optical lens 10 can be made as short as possible, and thus the miniaturization characteristics can be maintained.

When the above conditions are satisfied, the camera optical lens 10 will have high optical performance while satisfying design requirements for ultra-thin, wide-angle lenses having large apertures. With these characteristics, the camera optical lens 10 is especially suitable for high-pixel camera optical lens assembly of mobile phones and WEB camera optical lenses formed by imaging elements such as CCD and CMOS.

In the following, examples will be used to describe the camera optical lens 10 of the present invention. The symbols recorded in each example will be described as follows. The focal length, on-axis distance, curvature radius, on-axis thickness, inflexion point position, and arrest point position are all in units of mm.

TTL: Optical length (the total optical length from the object side surface of the first lens L1 to the image plane Si of the camera optical lens along the optic axis) in mm.

F number (FNO): a ratio of an effective focal length of the camera optical lens to an entrance pupil diameter (ENPD) of the camera optical lens.

Additionally, inflexion points and/or arrest points can be arranged on the object side surface and/or image side surface of the lens, so as to satisfy the demand for the high quality imaging. The description below can be referred to for specific implementations.

Design data of the camera optical lens 10 according to Embodiment 1 of the present invention will be described in the following.

Table 1 lists curvature radiuses R of the object side surfaces and the image side surfaces of the first lens L1 to the seventh lens L7 of the camera optical lens 10 according to Embodiment 1, on-axis thicknesses of respective lenses, distances d between two adjacent lenses, refractive indices nd and abbe numbers vd. It should be noted that R and d are both in units of mm in this embodiment.

TABLE 1

| | R | | d | nd | | vd | |
|---|---|---|---|---|---|---|---|
| S1 | ∞ | d0= | −0.695 | | | | |
| R1 | 2.659 | d1= | 0.967 | nd1 | 1.5444 | v1 | 55.82 |
| R2 | 12.799 | d2= | 0.060 | | | | |
| R3 | 3.452 | d3= | 0.250 | nd2 | 1.6700 | v2 | 19.39 |
| R4 | 2.603 | d4= | 0.787 | | | | |
| R5 | −307.003 | d5= | 0.320 | nd3 | 1.6700 | v3 | 19.39 |
| R6 | 11.419 | d6= | 0.048 | | | | |
| R7 | 15.802 | d7= | 0.788 | nd4 | 1.5444 | v4 | 55.82 |
| R8 | −15.285 | d8= | 0.322 | | | | |
| R9 | 9.930 | d9= | 0.464 | nd5 | 1.5801 | v5 | 34.49 |
| R10 | 7.762 | d10= | 0.260 | | | | |
| R11 | 2.307 | d11= | 0.548 | nd6 | 1.5444 | v6 | 55.82 |
| R12 | 9.304 | d12= | 0.993 | | | | |
| R13 | −5.547 | d13= | 0.424 | nd7 | 1.5359 | v7 | 54.54 |
| R14 | 3.719 | d14= | 0.323 | | | | |
| R15 | ∞ | d15= | 0.210 | ndg | 1.5168 | vg | 64.17 |
| R16 | ∞ | d16= | 0.390 | | | | |

In the table, meanings of various symbols will be described as follows.

S1: aperture;

R: central curvature radius of an optical surface;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;

R13: curvature radius of the object side surface of the seventh lens L7;

R14: curvature radius of the image side surface of the seventh lens L7;

R15: curvature radius of an object side surface of the optical filter GF;

R16: curvature radius of an image side surface of the optical filter GF;

d: on-axis thickness of a lens and an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the seventh lens L7;

d13: on-axis thickness of the seventh lens L7;

d14: on-axis distance from the image side surface of the seventh lens L7 to the object side surface of the optical filter GF;

d15: on-axis thickness of the optical filter GF;

d16: on-axis distance from the image side surface of the optical filter GF to the image plane;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

nd7: refractive index of d line of the seventh lens L7;

ndg: refractive index of d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7 vg: abbe number of the optical filter GF.

Table 2 shows aspheric surface data of respective lens in the camera optical lens 10 according to Embodiment 1 of the present invention.

TABLE 2

| | Conic coefficient | Aspherical coefficient | | | | |
|---|---|---|---|---|---|---|
| | k | A4 | A6 | A8 | A10 | A12 |
| R1 | 9.4380E−02 | −5.9022E−04 | 6.6007E−03 | −1.1584E−02 | 1.2145E−02 | −7.7666E−03 |
| R2 | −1.7952E+01 | −8.3972E−02 | 1.6142E−01 | −1.9927E−01 | 1.7096E−01 | −1.0096E−01 |
| R3 | −1.5701E+01 | −8.3965E−02 | 1.4821E−01 | −1.7031E−01 | 1.3795E−01 | −7.7507E−02 |
| R4 | −4.6211E+00 | −3.3501E−02 | 3.6411E−02 | −3.5014E−03 | −3.3946E−02 | 4.6060E−02 |
| R5 | −3.0000E+01 | −3.8985E−02 | −9.0311E−03 | 2.9748E−02 | −6.0982E−02 | 6.5758E−02 |
| R6 | −5.1310E−01 | −2.4804E−02 | −5.3620E−02 | 7.9546E−02 | −7.1811E−02 | 4.3544E−02 |
| R7 | 2.7617E+01 | 4.6410E−03 | −6.2347E−02 | 7.3953E−02 | −4.6582E−02 | 1.8212E−02 |

TABLE 2-continued

| | | | | | |
|---|---|---|---|---|---|
| R8 | 3.0000E+01 | −3.7395E−03 | −1.7880E−02 | 1.1234E−02 | −5.5286E−03 | 2.4813E−03 |
| R9 | 1.1739E+01 | −1.6298E−02 | 1.3173E−02 | −1.2662E−02 | 6.5501E−03 | −2.3810E−03 |
| R10 | 6.2901E+00 | −9.3511E−02 | 5.3368E−02 | −2.2899E−02 | 7.1833E−03 | −1.7813E−03 |
| R11 | −3.3332E+00 | −1.5821E−02 | 3.9499E−03 | −5.8262E−03 | 2.2034E−03 | −4.3443E−04 |
| R12 | 1.9098E+00 | 6.7522E−02 | −3.7827E−02 | 9.0780E−03 | −1.2958E−03 | 1.0526E−04 |
| R13 | −1.8896E+01 | −5.1994E−02 | 1.5675E−02 | −3.3260E−03 | 5.7903E−04 | −7.1287E−05 |
| R14 | −1.4089E+01 | −3.0745E−02 | 7.9389E−03 | −1.6758E−03 | 2.3649E−04 | −2.1014E−05 |

| | Conic coefficient | Aspherical coefficient | | | |
|---|---|---|---|---|---|
| | k | A14 | A16 | A18 | A20 |
| R1 | 9.4380E−02 | 3.0973E−03 | −7.4662E−04 | 9.8697E−05 | −5.4126E−06 |
| R2 | −1.7952E+01 | 3.9975E−02 | −1.0092E−02 | 1.4641E−03 | −9.2625E−05 |
| R3 | −1.5701E+01 | 2.9330E−02 | −7.0859E−03 | 9.8528E−04 | −5.9718E−05 |
| R4 | −4.6211E+00 | −3.1029E−02 | 1.1930E−02 | −2.4924E−03 | 2.2093E−04 |
| R5 | −3.0000E+01 | −4.2657E−02 | 1.6414E−02 | −3.4409E−03 | 3.0405E−04 |
| R6 | −5.1310E−01 | −1.8124E−02 | 4.9454E−03 | −7.8288E−04 | 5.3980E−05 |
| R7 | 2.7617E+01 | −4.5112E−03 | 6.9133E−04 | −5.9964E−05 | 2.2544E−06 |
| R8 | 3.0000E+01 | −7.4738E−04 | 1.2596E−04 | −9.7906E−06 | 2.1495E−07 |
| R9 | 1.1739E+01 | 5.8929E−04 | −9.1162E−05 | 7.7813E−06 | −2.7570E−07 |
| R10 | 6.2901E+00 | 3.3565E−04 | −4.2043E−05 | 2.9811E−06 | −8.9296E−08 |
| R11 | −3.3332E+00 | 4.7478E−05 | −2.5256E−06 | 3.5239E−08 | 1.0778E−09 |
| R12 | 1.9098E+00 | −3.0620E−06 | −2.0489E−07 | 1.9545E−08 | −4.6218E−10 |
| R13 | −1.8896E+01 | 5.6702E−06 | −2.7528E−07 | 7.4026E−09 | −8.4329E−11 |
| R14 | −1.4089E+01 | 1.0941E−06 | −2.7338E−08 | 6.1593E−11 | 6.9761E−12 |

In Table 2, k is a conic coefficient, and A4, A6, A8, A10, A12, A14, A16, A18 and A20 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (4)$$

where x is a vertical distance between a point on an aspherical curve and the optic axis, and y is an aspherical depth (a vertical distance between a point on an aspherical surface, having a distance of x from the optic axis, and a surface tangent to a vertex of the aspherical surface on the optic axis).

In an embodiment, an aspheric surface of each lens surface may use the aspheric surfaces shown in the above condition (4). However, the present invention is not limited to the aspherical polynomials form shown in the condition (4).

Table 3 and Table 4 show design data of inflexion points and arrest points of respective lens in the camera optical lens 10 according to the embodiment of the present invention. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; P5R1 and P5R2 represent the object side surface and the image side surface of the fifth lens L5, respectively; P6R1 and P6R2 represent the object side surface and the image side surface of the sixth lens L6, respectively; and P7R1 and P7R2 represent the object side surface and the image side surface of the seventh lens L7, respectively. The data in the column "inflexion point position" refers to vertical distances from inflexion points arranged on each lens surface to the optic axis of the camera optical lens 10. The data in the column "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 | Inflexion point position 4 |
|---|---|---|---|---|---|
| P1R1 | 0 | / | / | / | / |
| P1R2 | 2 | 0.435 | 0.495 | / | / |
| P2R1 | 0 | / | / | / | / |
| P2R2 | 0 | / | / | / | / |
| P3R1 | 0 | / | / | / | / |
| P3R2 | 2 | 0.435 | 1.655 | / | / |
| P4R1 | 2 | 0.545 | 1.195 | / | / |
| P4R2 | 1 | 1.715 | / | / | / |
| P5R1 | 2 | 0.945 | 2.335 | / | / |
| P5R2 | 3 | 0.385 | 2.055 | 2.645 | / |
| P6R1 | 2 | 1.005 | 2.525 | / | / |
| P6R2 | 2 | 1.235 | 3.195 | / | / |
| P7R1 | 1 | 1.925 | / | / | / |
| P7R2 | 4 | 0.745 | 3.365 | 3.805 | 4.075 |

TABLE 4

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 1 | 0.725 | / |
| P4R1 | 2 | 1.055 | 1.315 |
| P4R2 | 1 | 2.035 | / |
| P5R1 | 1 | 1.415 | / |
| P5R2 | 1 | 0.735 | / |
| P6R1 | 1 | 1.675 | / |
| P6R2 | 1 | 1.935 | / |
| P7R1 | 1 | 3.295 | / |
| P7R2 | 1 | 1.575 | / |

In addition, Table 13 below further lists various values of Embodiment 1 and values corresponding to parameters which are specified in the above conditions.

As shown in Table 13, Embodiment 1 satisfies the respective conditions.

Figure 2:
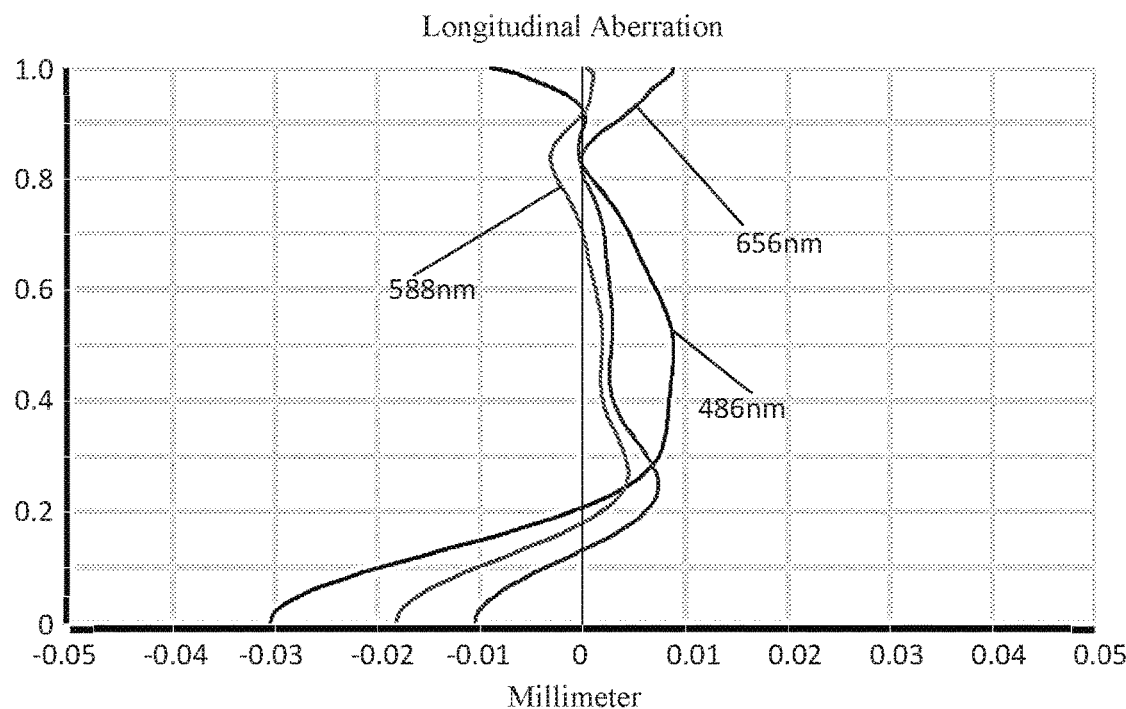
FIG. 2 is a schematic diagram of a longitudinal aberration of the camera optical lens shown in FIG. 1.
Figure 3:
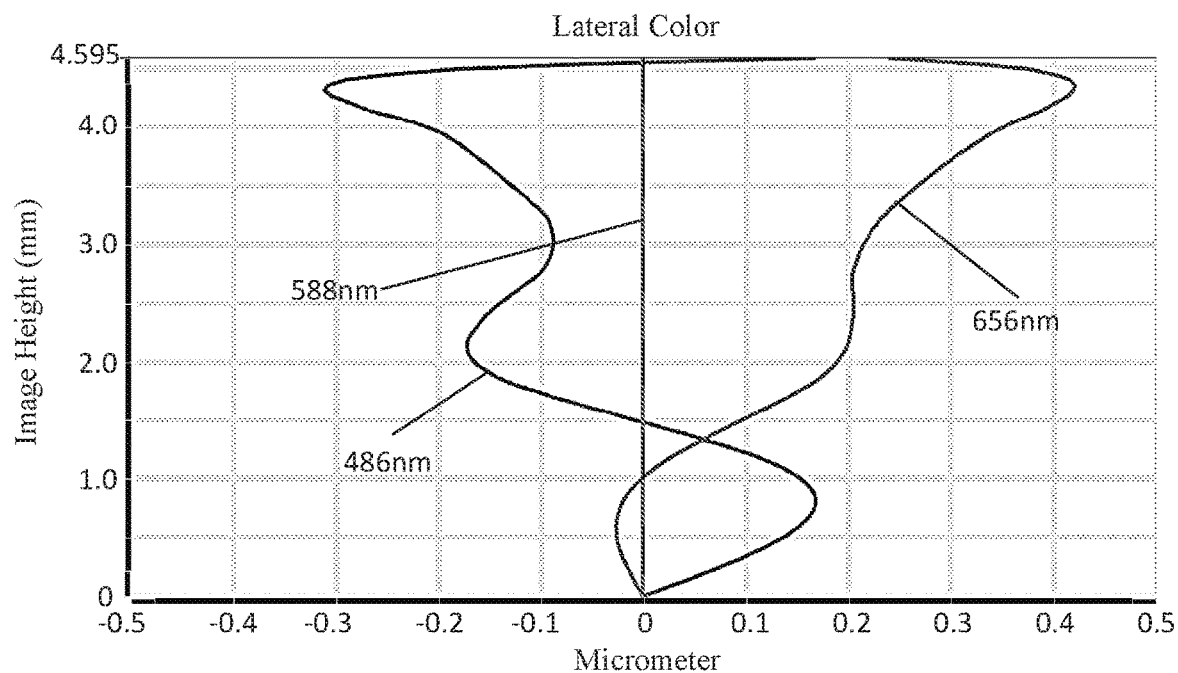
FIG. 3 is a schematic diagram of a lateral color of the camera optical lens shown in FIG. 1.
Figure 4:
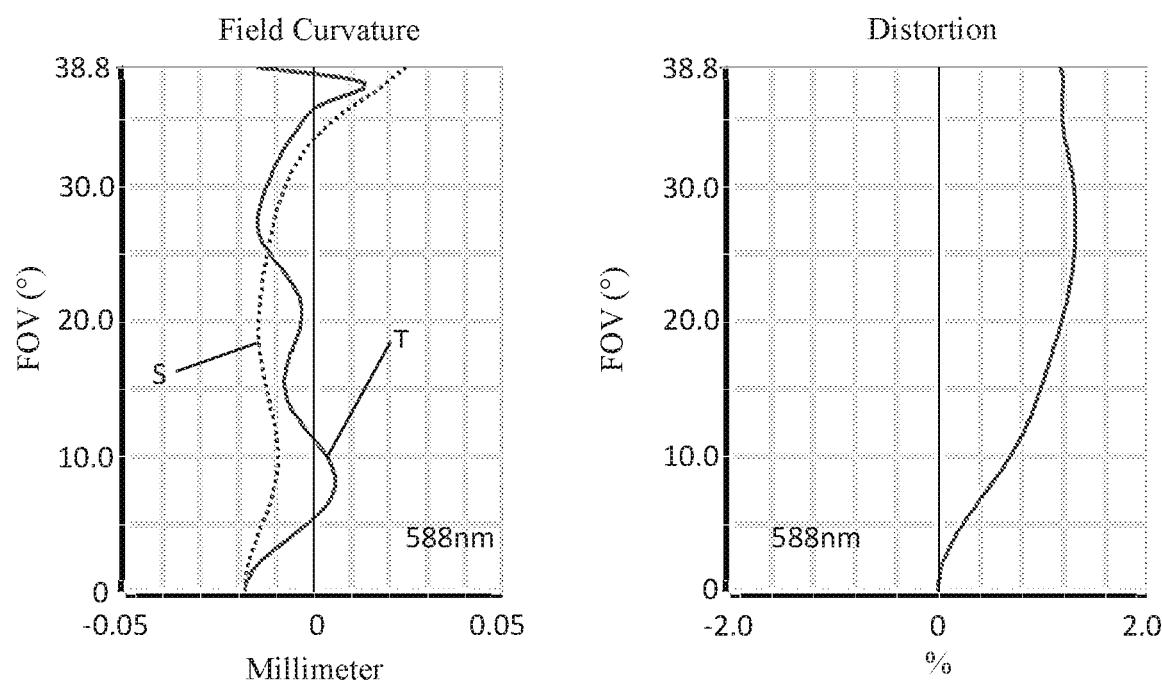
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 486 nm, 588 nm and 656 nm after passing the camera optical lens 10 according to Embodiment 1. FIG. 4 illustrates a field curvature and a distortion of light with a wavelength of 588 nm after passing the camera optical lens 10 according to Embodiment 1, in which a field curvature S is a field curvature in a sagittal direction and T is a field curvature in a tangential direction.

In this embodiment, the entrance pupil diameter (ENPD) of the camera optical lens 10 is 3.510 mm. The image height of 1.0H is 4.595 mm. The FOV (field of view) along a diagonal direction is 77.64°. Thus, the camera optical lens can provide a large-aperture, ultra-thin, wide-angle lens while having on-axis and off-axis aberrations sufficiently corrected, thereby leading to better optical characteristics.

Embodiment 2

Figure 5:
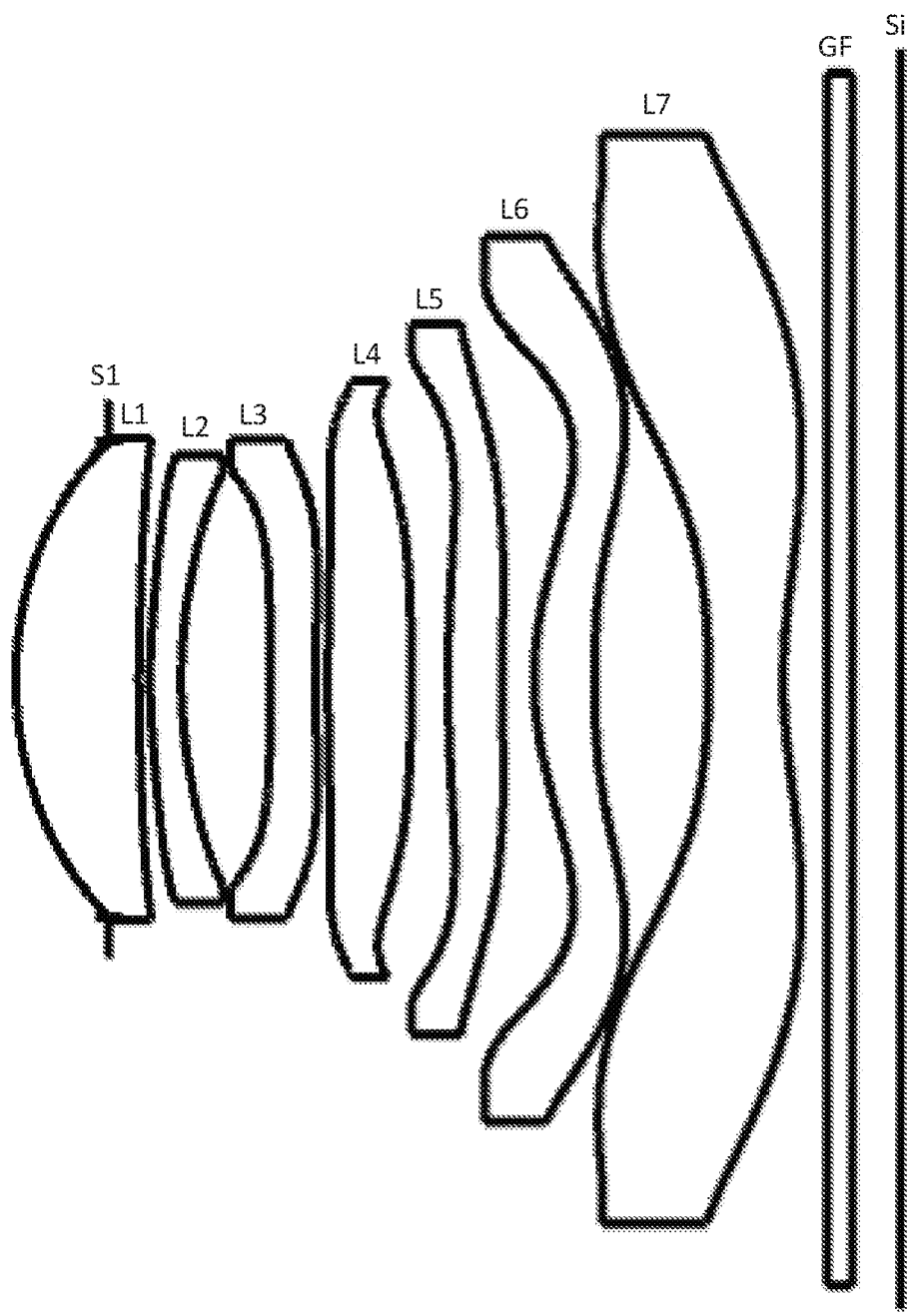
FIG. 5 is a schematic diagram of a structure of a camera optical lens in accordance with Embodiment 2 of the present invention.

FIG. 5 is a schematic diagram of a structure of a camera optical lens 20 in accordance with Embodiment 2 of the present invention. Embodiment 2 is basically the same as Embodiment 1 and involves symbols having the same meanings as Embodiment 1. Only differences therebetween will be described in the following.

In this embodiment, the object side surface of the third lens L3 is convex in the paraxial region.

Table 5 shows design data of a camera optical lens 20 in Embodiment 2 of the present invention.

TABLE 5

|  | R | d |  | nd |  | vd |
|---|---|---|---|---|---|---|
| S1 | ∞ | d0= | −0.747 |  |  |  |
| R1 | 2.566 | d1= | 0.994 | nd1 | 1.5444 | v1 | 55.82 |
| R2 | 9.737 | d2= | 0.093 |  |  |  |
| R3 | 4.256 | d3= | 0.250 | nd2 | 1.6700 | v2 | 19.39 |
| R4 | 3.152 | d4= | 0.716 |  |  |  |
| R5 | 46.743 | d5= | 0.371 | nd3 | 1.6700 | v3 | 19.39 |
| R6 | 9.812 | d6= | 0.101 |  |  |  |
| R7 | 16.820 | d7= | 0.673 | nd4 | 1.5444 | v4 | 55.82 |
| R8 | −18.146 | d8= | 0.297 |  |  |  |
| R9 | 9.621 | d9= | 0.435 | nd5 | 1.5878 | v5 | 30.79 |
| R10 | 7.697 | d10= | 0.261 |  |  |  |
| R11 | 2.309 | d11= | 0.489 | nd6 | 1.5444 | v6 | 55.82 |
| R12 | 8.696 | d12= | 0.919 |  |  |  |
| R13 | −6.663 | d13= | 0.605 | nd7 | 1.5427 | v7 | 55.79 |
| R14 | 3.528 | d14= | 0.351 |  |  |  |
| R15 | ∞ | d15= | 0.210 | ndg | 1.5168 | vg | 64.17 |
| R16 | ∞ | d16= | 0.391 |  |  |  |

Table 6 shows aspheric surface data of respective lenses in the camera optical lens 20 according to Embodiment 2 of the present invention.

TABLE 6

|  | Conic coefficient | Aspherical coefficient | | | | |
|---|---|---|---|---|---|---|
|  | k | A4 | A6 | A8 | A10 | A12 |
| R1 | 8.6552E−02 | 1.7861E−05 | 2.0606E−03 | −2.0934E−03 | 9.4474E−04 | 3.3748E−04 |
| R2 | −2.1154E+01 | −4.9628E−02 | 5.9491E−02 | −4.3718E−02 | 2.1318E−02 | −6.1799E−03 |
| R3 | −1.7441E+01 | −6.3270E−02 | 6.2824E−02 | −2.5492E−02 | −8.4762E−03 | 1.9035E−02 |
| R4 | −4.5584E+00 | −3.2967E−02 | 2.4330E−02 | 1.9526E−02 | −5.4467E−03 | 5.6838E−02 |
| R5 | 3.0000E+01 | −4.6770E−02 | 7.3357E−03 | −1.1053E−02 | 3.2494E−03 | 3.4758E−03 |
| R6 | −1.2577E+01 | −3.6221E−02 | −2.2075E−02 | 3.7370E−02 | −4.0396E−02 | 3.0441E−02 |
| R7 | 2.8710E+01 | −5.9791E−03 | −2.2174E−02 | 1.4061E−02 | 2.7561E−03 | −6.3159E−03 |
| R8 | 2.4621E+01 | 1.7890E−04 | −2.7835E−02 | 2.3352E−02 | −1.5863E−02 | 8.4752E−03 |
| R9 | 1.2001E+01 | −1.5694E−02 | 7.5495E−03 | −6.0921E−03 | 2.0608E−03 | −6.1769E−04 |
| R10 | 6.3626E+00 | −9.5710E−02 | 5.3041E−02 | −1.9843E−02 | 4.5058E−03 | −6.8876E−04 |
| R11 | −3.3381E+00 | −1.0643E−02 | −3.3920E−03 | −1.0737E−03 | 4.8953E−04 | −6.2443E−05 |
| R12 | 1.0904E+00 | 7.2237E−02 | −4.6258E−02 | 1.4031E−02 | −2.9193E−03 | 4.2891E−04 |
| R13 | −2.2502E+01 | −4.5772E−02 | 8.2055E−03 | −1.9504E−05 | −1.8049E−04 | 3.0758E−05 |
| R14 | −8.9934E+00 | −3.2257E−02 | 7.3398E−03 | −1.3407E−03 | 1.8060E−04 | −1.7643E−05 |

|  | Conic coefficient | Aspherical coefficient | | | |
|---|---|---|---|---|---|
|  | k | A14 | A16 | A18 | A20 |
| R1 | 8.6552E−02 | −5.5952E−04 | 2.5562E−04 | −5.3833E−05 | 4.4498E−06 |
| R2 | −2.1154E+01 | 5.9571E−04 | 2.1761E−04 | −7.6525E−05 | 7.5007E−06 |
| R3 | −1.7441E+01 | −1.2551E−02 | 4.4463E−03 | −8.4161E−04 | 6.7154E−05 |
| R4 | −4.5584E+00 | −3.4480E−02 | 1.2606E−02 | −2.5745E−03 | 2.2727E−04 |
| R5 | 3.0000E+01 | −4.8262E−03 | 2.3373E−03 | −5.0631E−04 | 4.1734E−05 |
| R6 | −1.2577E+01 | −1.5496E−02 | 4.9098E−03 | −8.5693E−04 | 6.2833E−05 |
| R7 | 2.8710E+01 | 2.9851E−03 | −6.8545E−04 | 7.9630E−05 | −3.7633E−06 |
| R8 | 2.4621E+01 | −2.8940E−03 | 5.7107E−04 | −5.8631E−05 | 2.3549E−06 |
| R9 | 1.2001E+01 | 1.9995E−04 | −4.6139E−05 | 5.5803E−06 | −2.6197E−07 |
| R10 | 6.3626E+00 | 9.1252E−05 | −1.1261E−05 | 9.2462E−07 | −3.2212E−08 |
| R11 | −3.3381E+00 | −4.1894E−06 | 2.0792E−06 | −2.0460E−07 | 6.5499E−09 |
| R12 | 1.0904E+00 | −4.3300E−05 | 2.8310E−06 | −1.0663E−07 | 1.7353E−09 |
| R13 | −2.2502E+01 | −2.6801E−06 | 1.3501E−07 | −3.7226E−09 | 4.3461E−11 |
| R14 | −8.9934E+00 | 1.2105E−06 | −5.4284E−08 | 1.4053E−09 | −1.5743E−11 |

Table 7 and Table 8 show design data of inflexion points and arrest points of respective lens in the camera optical lens 20 according to Embodiment 2 of the present invention.

TABLE 7

|  | Number of inflexion points | Inflexion point position 1 | Inflexion point position 2 | Inflexion point position 3 | Inflexion point position 4 |
|---|---|---|---|---|---|
| P1R1 | 0 | / | / | / | / |
| P1R2 | 0 | / | / | / | / |
| P2R1 | 0 | / | / | / | / |
| P2R2 | 0 | / | / | / | / |
| P3R1 | 1 | 0.205 | / | / | / |
| P3R2 | 2 | 0.445 | 1.645 | / | / |
| P4R1 | 3 | 0.565 | 1.225 | 2.155 | / |
| P4R2 | 2 | 1.685 | 2.195 | / | / |
| P5R1 | 2 | 0.905 | 2.245 | / | / |
| P5R2 | 4 | 0.385 | 2.145 | 2.254 | 2.385 |
| P6R1 | 2 | 1.005 | 2.495 | / | / |
| P6R2 | 3 | 1.205 | 2.935 | 3.225 | / |
| P7R1 | 1 | 1.885 | / | / | / |
| P7R2 | 2 | 0.795 | 3.605 | / | / |

TABLE 8

|  | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 1 | 0.345 | / |
| P3R2 | 1 | 0.765 | / |
| P4R1 | 2 | 1.035 | 1.385 |
| P4R2 | 1 | 1.995 | / |
| P5R1 | 1 | 1.365 | / |
| P5R2 | 1 | 0.735 | / |
| P6R1 | 1 | 1.675 | / |
| P6R2 | 1 | 1.885 | / |
| P7R1 | 1 | 3.295 | / |
| P7R2 | 1 | 1.675 | / |

In addition, Table 13 below further lists various values of Embodiment 2 and values corresponding to parameters which are specified in the above conditions.

As shown in Table 13, Embodiment 2 satisfies the respective conditions.

Figure 6:
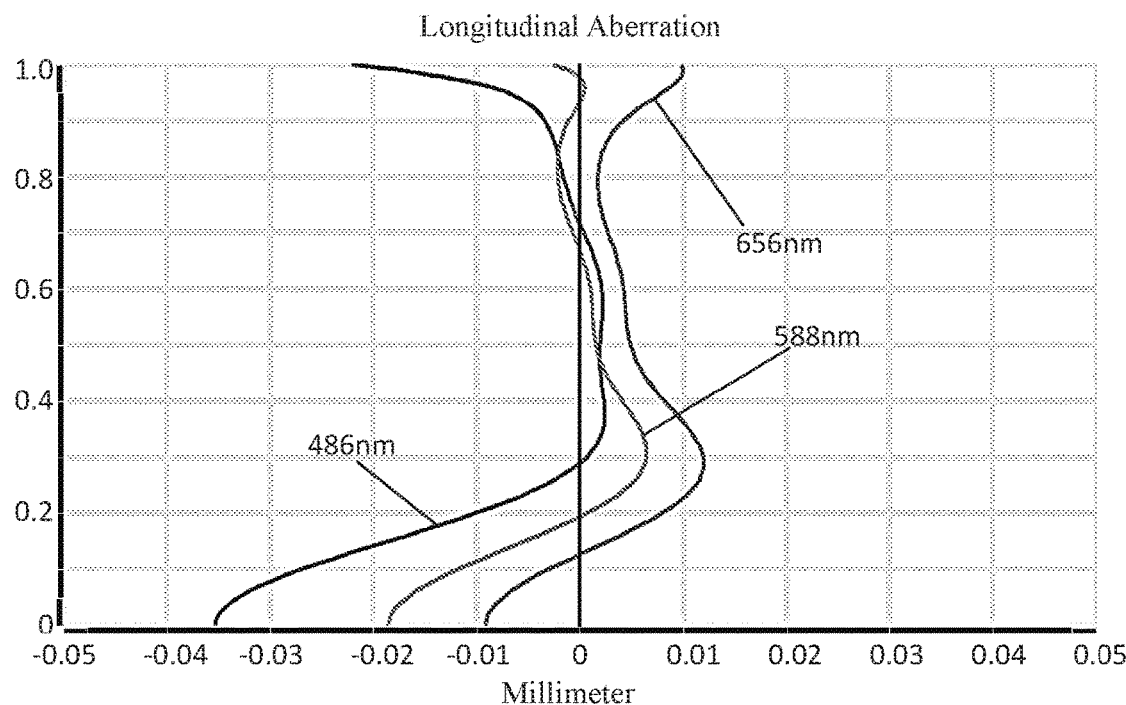
FIG. 6 is a schematic diagram of a longitudinal aberration of the camera optical lens shown in FIG. 5.
Figure 7:
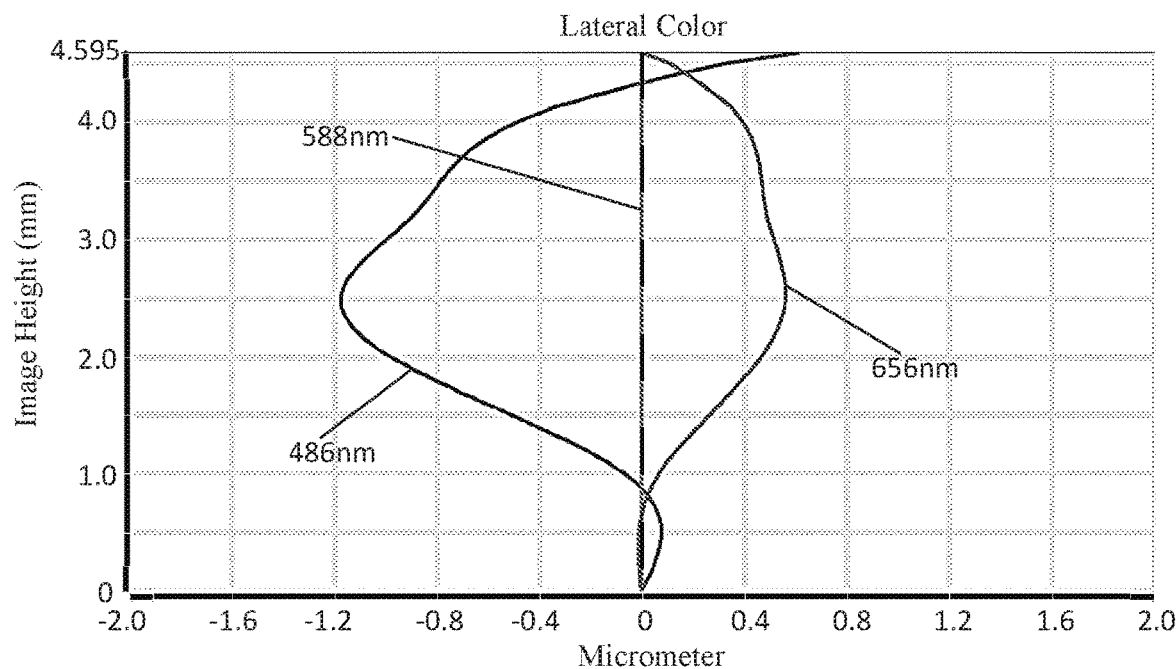
FIG. 7 is a schematic diagram of a lateral color of the camera optical lens shown in FIG. 5.
Figure 8:
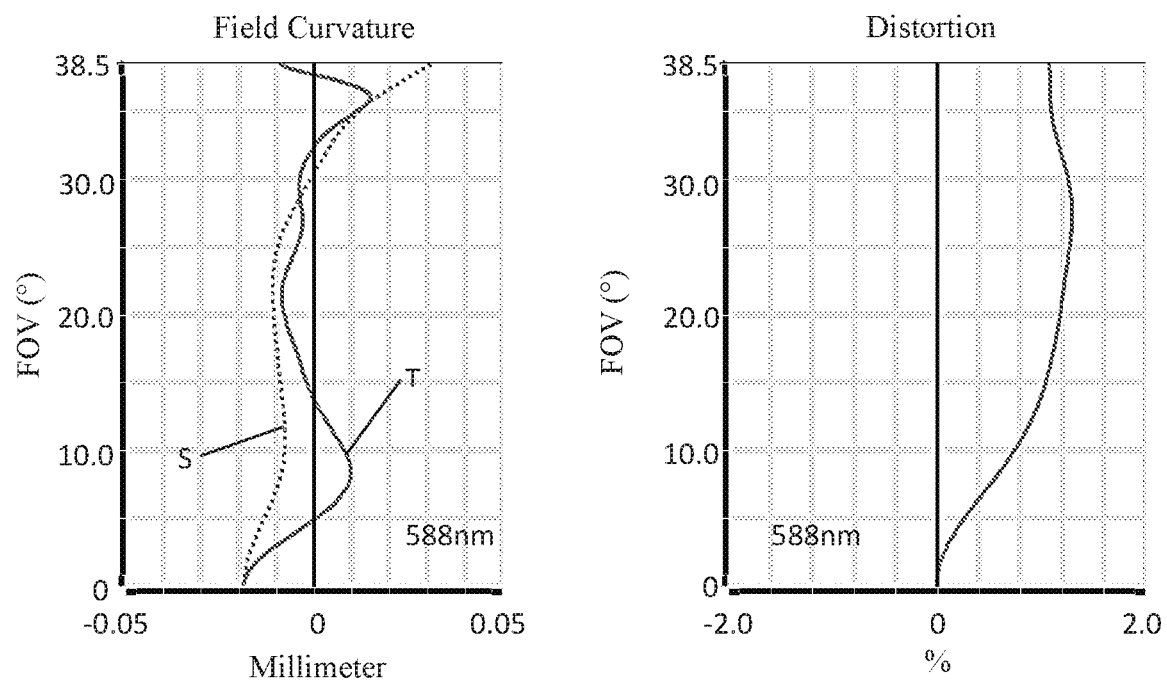
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 486 nm, 588 nm and 656 nm after passing the camera optical lens 20 according to Embodiment 2. FIG. 8 illustrates a field curvature and a distortion of light with a wavelength of 588 nm after passing the camera optical lens 20 according to Embodiment 2.

In this embodiment, the entrance pupil diameter (ENPD) of the camera optical lens 20 is 3.550 mm. The image height of 1.0H is 4.595 mm. The FOV (field of view) along a diagonal direction is 77.03°. Thus, the camera optical lens 20 can provide a large-aperture, ultra-thin, wide-angle lens while having on-axis and off-axis aberrations sufficiently corrected, thereby leading to better optical characteristics.

Embodiment 3

Figure 9:
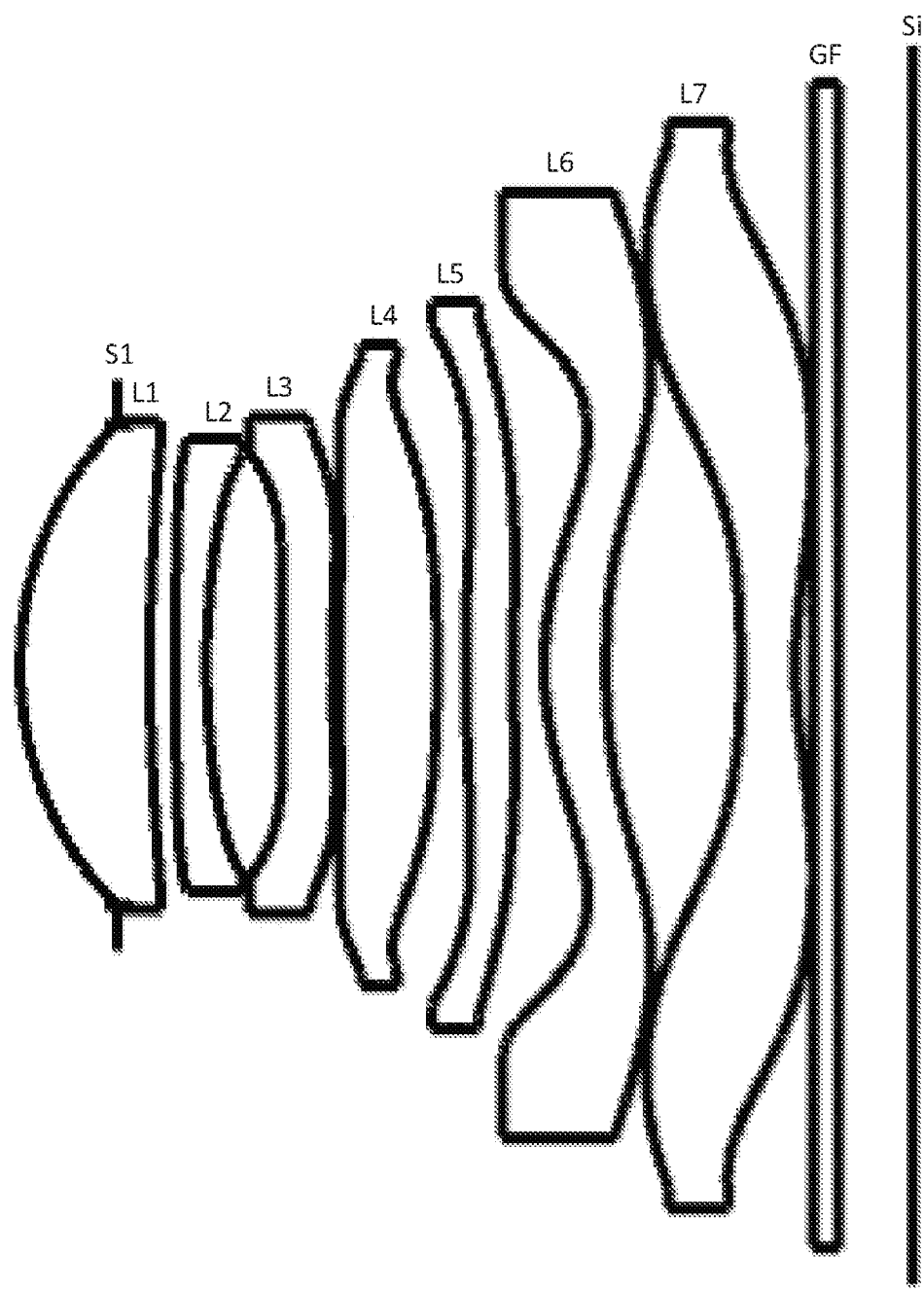
FIG. 9 is a schematic diagram of a structure of a camera optical lens in accordance with Embodiment 3 of the present invention.

FIG. 9 is a schematic diagram of a structure of a camera optical lens 30 in accordance with Embodiment 3 of the present invention. Embodiment 3 is basically the same as Embodiment 1 and involves symbols having the same meanings as Embodiment 1. Only differences therebetween will be described in the following.

In this embodiment, the object side surface of the third lens L3 is convex in the paraxial region.

Table 9 shows design data of a camera optical lens 30 in Embodiment 3 of the present invention.

TABLE 9

|  | R |  | d | nd |  | vd |
|---|---|---|---|---|---|---|
| S1 | ∞ | d0= | −0.784 |  |  |  |
| R1 | 2.480 | d1= | 1.040 | nd1 | 1.5444 | v1 | 55.82 |
| R2 | 12.158 | d2= | 0.199 |  |  |  |
| R3 | 14.534 | d3= | 0.255 | nd2 | 1.6700 | v2 | 19.39 |
| R4 | 5.369 | d4= | 0.604 |  |  |  |
| R5 | 17.550 | d5= | 0.404 | nd3 | 1.6700 | v3 | 19.39 |
| R6 | 8.253 | d6= | 0.060 |  |  |  |
| R7 | 23.358 | d7= | 0.780 | nd4 | 1.5444 | v4 | 55.82 |
| R8 | −13.379 | d8= | 0.230 |  |  |  |
| R9 | 10.967 | d9= | 0.380 | nd5 | 1.6136 | v5 | 25.75 |
| R10 | 7.426 | d10= | 0.248 |  |  |  |
| R11 | 2.219 | d11= | 0.498 | nd6 | 1.5444 | v6 | 55.82 |
| R12 | 6.292 | d12= | 1.078 |  |  |  |
| R13 | −9.929 | d13= | 0.440 | nd7 | 1.5391 | v7 | 55.70 |
| R14 | 3.337 | d14= | 0.137 |  |  |  |
| R15 | ∞ | d15= | 0.210 | ndg | 1.5168 | vg | 64.17 |
| R16 | ∞ | d16= | 0.590 |  |  |  |

Table 10 shows aspheric surface data of respective lenses in the camera optical lens 30 according to Embodiment 3 of the present invention.

TABLE 10

|  | Conic coefficient | Aspherical coefficient | | | | |
|---|---|---|---|---|---|---|
|  | k | A4 | A6 | A8 | A10 | A12 |
| R1 | 2.0223E−02 | −3.1254E−04 | 3.0564E−03 | −4.1443E−03 | 4.0282E−03 | −2.4950E−03 |
| R2 | −9.5409E+00 | −9.6888E−03 | 3.2720E−03 | 2.9650E−03 | −4.6027E−03 | 3.0116E−03 |
| R3 | 2.8844E+01 | −3.2713E−02 | 2.4914E−02 | −8.9654E−03 | 7.4707E−04 | 1.1788E−03 |
| R4 | −5.3143E−01 | −1.8231E−02 | 1.0191E−02 | 2.5747E−02 | −5.1958E−02 | 5.2493E−02 |
| R5 | 2.9588E+01 | −3.4831E−02 | −2.4303E−02 | 4.5391E−02 | −5.9801E−02 | 4.6074E−02 |
| R6 | 4.2043E+00 | −1.0857E−02 | −7.8913E−02 | 1.0393E−01 | −8.6574E−02 | 4.7560E−02 |
| R7 | 2.9002E+01 | 1.6851E−02 | −7.9698E−02 | 8.8487E−02 | −5.4105E−02 | 2.0253E−02 |
| R8 | 2.8431E+01 | 6.7968E−03 | −4.8181E−02 | 4.3733E−02 | −2.5128E−02 | 1.0489E−02 |
| R9 | 1.5004E+01 | −1.6469E−02 | 3.0779E−03 | −2.8959E−03 | 1.8742E−03 | −5.7911E−04 |
| R10 | 6.3073E+00 | −1.0539E−01 | −7.3067E−02 | −4.0407E−02 | 1.6971E−02 | −5.0633E−03 |
| R11 | −3.0447E+00 | −1.9932E−02 | 5.7084E−03 | −3.6315E−03 | 3.3287E−04 | 2.2025E−04 |

TABLE 10-continued

| | | | | | |
|---|---|---|---|---|---|
| R12 | 1.5666E+00 | 6.1796E-02 | -3.6328E-02 | 9.6417E-03 | -1.7435E-03 | 2.2914E-04 |
| R13 | -1.2287E+01 | -5.3472E-02 | 1.0723E-02 | -3.9469E-04 | -9.7891E-05 | 1.3500E-05 |
| R14 | -1.0767E+01 | -3.2472E-02 | 6.3713E-03 | -9.2483E-04 | 8.7011E-05 | -5.2151E-06 |

| | Conic coefficient | Aspherical coefficient | | | |
|---|---|---|---|---|---|
| | k | A14 | A16 | A18 | A20 |
| R1 | 2.0223E-02 | 9.9885E-04 | -2.4903E-04 | 3.5254E-05 | -2.2228E-06 |
| R2 | -9.5409E+00 | -1.1655E-03 | 2.6810E-04 | -3.3509E-05 | 1.7415E-06 |
| R3 | 2.8844E+01 | -7.2224E-04 | 2.1117E-04 | -3.0592E-05 | 1.8868E-06 |
| R4 | -5.3143E-01 | -3.2500E-02 | 1.2416E-02 | -2.6909E-03 | 2.5589E-04 |
| R5 | 2.9588E+01 | -2.1619E-02 | 5.8724E-03 | -8.0785E-04 | 4.1167E-05 |
| R6 | 4.2043E+00 | -1.7505E-02 | 4.1849E-03 | -5.8184E-04 | 3.5509E-05 |
| R7 | 2.9002E+01 | -4.6808E-03 | 6.5100E-04 | -4.9886E-05 | 1.6107E-06 |
| R8 | 2.8431E+01 | -3.0206E-03 | 5.5116E-04 | -5.5716E-05 | 2.3418E-06 |
| R9 | 1.5004E+01 | 2.8718E-05 | 2.1464E-05 | -4.2830E-06 | 2.4124E-07 |
| R10 | 6.3073E+00 | 9.8958E-04 | -1.1789E-04 | 7.6954E-06 | -2.0995E-07 |
| R11 | -3.0447E+00 | -8.2652E-05 | 1.2498E-05 | -8.9034E-07 | 2.4440E-08 |
| R12 | 1.5666E+00 | -2.1371E-05 | 1.3246E-06 | -4.8547E-08 | 7.9240E-10 |
| R13 | -1.2287E+01 | -6.0803E-07 | -1.0198E-09 | 9.1207E-10 | -2.1127E-11 |
| R14 | -1.0767E+01 | 1.6842E-07 | 1.4429E-09 | -3.1268E-10 | 6.9532E-12 |

Table 11 and Table 12 show design data of inflexion points and arrest points of respective lens in the camera optical lens 30 according to Embodiment 3 of the present invention.

TABLE 11

| | Number of inflexion points | Inflexion point position 1 | Inflexion point position 2 | Inflexion point position 3 |
|---|---|---|---|---|
| P1R1 | 0 | / | / | / |
| P1R2 | 1 | 1.535 | / | / |
| P2R1 | 0 | / | / | / |
| P2R2 | 0 | / | / | / |
| P3R1 | 1 | 0.355 | / | / |
| P3R2 | 2 | 0.525 | 1.625 | / |
| P4R1 | 3 | 0.525 | 1.355 | 2.205 |
| P4R2 | 2 | 1.755 | 2.255 | / |
| P5R1 | 2 | 0.775 | 2.435 | / |
| P5R2 | 2 | 0.375 | 2.495 | / |
| P6R1 | 2 | 1.055 | 2.485 | / |
| P6R2 | 2 | 1.295 | 3.355 | / |
| P7R1 | 2 | 1.785 | 3.825 | / |
| P7R2 | 3 | 0.745 | 3.115 | 3.985 |

TABLE 12

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 1 | 0.595 | / |
| P3R2 | 1 | 0.875 | / |
| P4R1 | 2 | 0.865 | 1.595 |
| P4R2 | 2 | 2.095 | 2.365 |
| P5R1 | 1 | 1.365 | / |
| P5R2 | 2 | 0.735 | 2.645 |
| P6R1 | 2 | 1.725 | 2.945 |
| P6R2 | 1 | 2.175 | / |
| P7R1 | 1 | 3.015 | / |
| P7R2 | 2 | 1.555 | 3.815 |

In addition, Table 13 below further lists various values of Embodiment 3 and values corresponding to parameters which are specified in the above conditions.

As shown in Table 13, Embodiment 3 satisfies the respective conditions.

Figure 10:
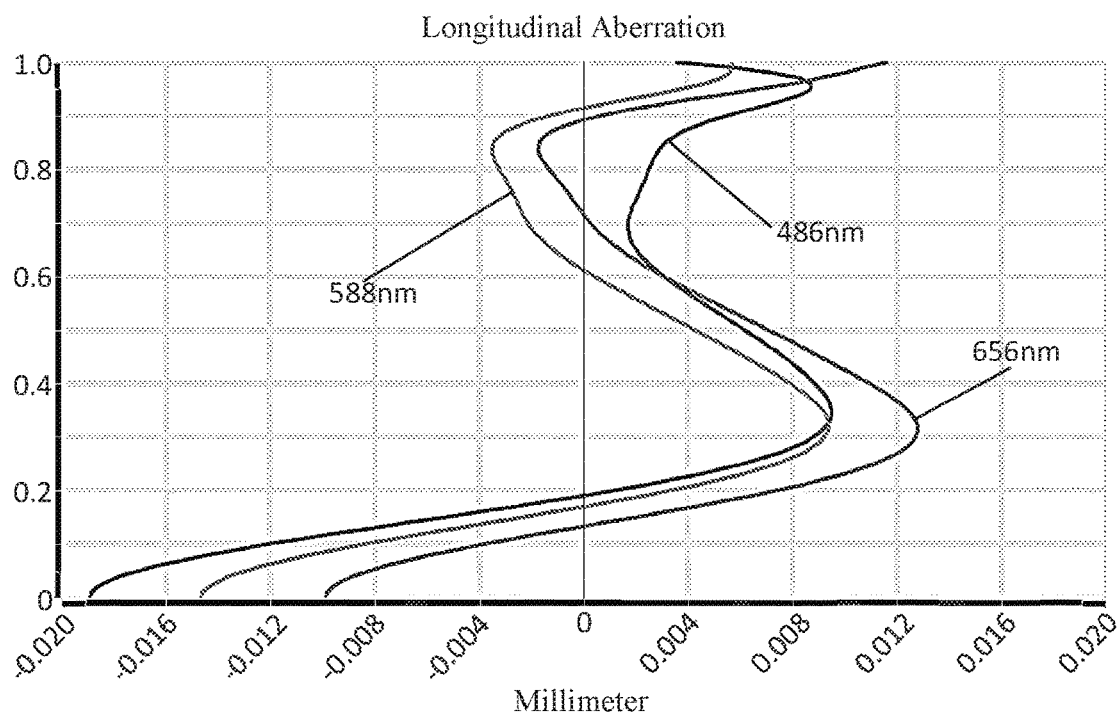
FIG. 10 is a schematic diagram of a longitudinal aberration of the camera optical lens shown in FIG. 9.
Figure 11:
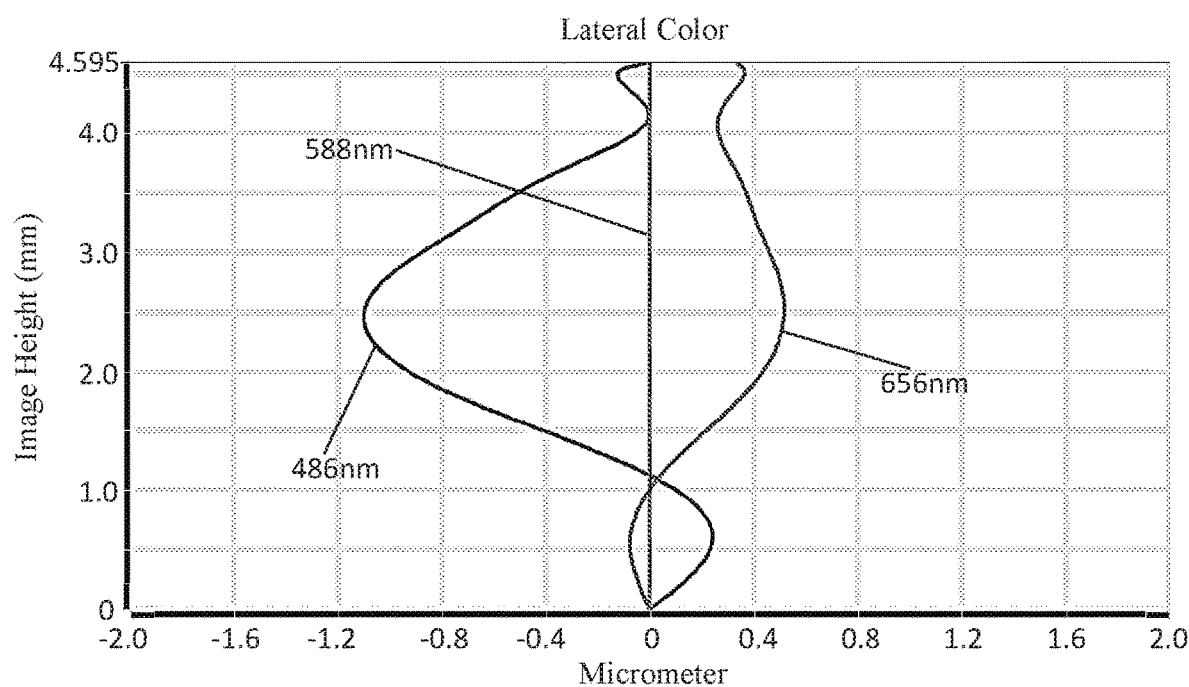
FIG. 11 is a schematic diagram of a lateral color of the camera optical lens shown in FIG. 9.
Figure 12:
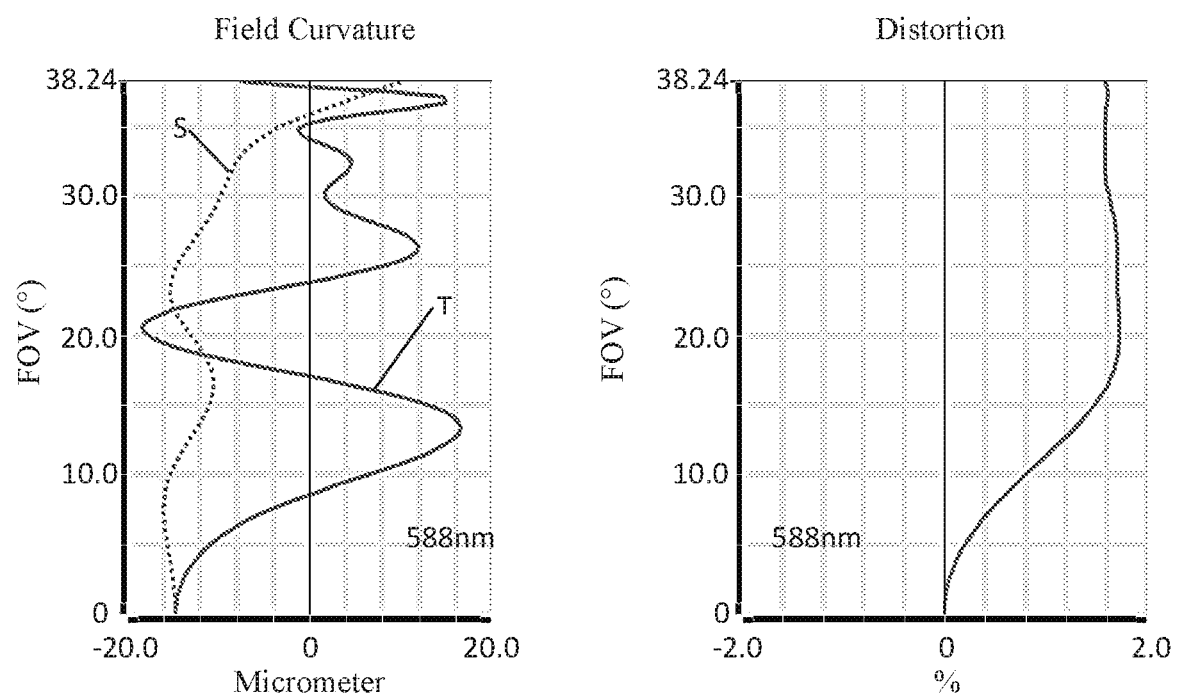
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 486 nm, 588 nm and 656 nm after passing the camera optical lens 30 according to Embodiment 3. FIG. 12 illustrates field curvature and distortion of light with a wavelength of 588 nm after passing the camera optical lens 30 according to Embodiment 3.

In this embodiment, the entrance pupil diameter (ENPD) of the camera optical lens 30 is 3.572 mm. The image height of 1.0H is 4.595 mm. The FOV (field of view) along a diagonal direction is 76.48°. Thus, the camera optical lens 30 can provide a large-aperture, ultra-thin, wide-angle lens while having on-axis and off-axis aberrations sufficiently corrected, thereby leading to better optical characteristics.

Table 13 below further lists various values of Embodiments 1, 2 and 3 and values corresponding to parameters which are specified in the above conditions.

TABLE 13

| Parameters and Conditions | Embodiment 1 | Embodiment 2 | Embodiment 3 |
|---|---|---|---|
| f | 5.615 | 5.680 | 5.715 |
| f1 | 5.966 | 6.101 | 5.513 |
| f2 | -17.902 | -19.960 | -12.850 |
| f3 | -16.424 | -18.609 | -23.662 |
| f4 | 14.401 | 16.144 | 15.744 |
| f5 | -66.538 | -71.490 | -39.074 |
| f6 | 5.485 | 5.624 | 6.037 |
| f7 | -4.089 | -4.164 | -4.580 |
| FNO | 1.60 | 1.60 | 1.60 |
| TTL | 7.153 | 7.153 | 7.153 |
| IH | 4.595 | 4.595 | 4.595 |
| FOV | 77.67° | 77.03° | 76.48° |
| R7/d7 | 20.05 | 25.00 | 29.96 |
| v7 − v5 | 20.05 | 25.00 | 29.95 |
| (R1 − R2)/(R3 − R4) | -11.94 | -6.50 | -1.06 |

It can be appreciated by one having ordinary skill in the art that the description above is only embodiments of the present invention. In practice, one having ordinary skill in the art can make various modifications to these embodiments in forms and details without departing from the spirit and scope of the present invention.

What is claimed is:

1. A camera optical lens, comprising, sequentially from an object side to an image side:
   a first lens having a positive refractive power;
   a second lens having a negative refractive power;
   a third lens having a negative refractive power;
   a fourth lens having a positive refractive power;
   a fifth lens having a negative refractive power;
   a sixth lens having a positive refractive power; and
   a seventh lens having a negative refractive power,
   wherein the camera optical lens satisfies following conditions:

$20.00 \leq R7/d7 \leq 30.00$;

$20.00 \leq v7-v5 \leq 30.00$;

$-12.00 \leq (R1-R2)/(R3-R4) \leq -1.00$;

$-0.08 \leq (R7+R8)/(R7-R8) \leq 0.41$, where
   v5 denotes an abbe number of the fifth lens;
   v7 denotes an abbe number of the seventh lens;
   R1 denotes a curvature radius of an object side surface of the first lens;
   R2 denotes a curvature radius of an image side surface of the first lens;
   R3 denotes a curvature radius of an object side surface of the second lens;
   R4 denotes a curvature radius of an image side surface of the second lens;
   R7 denotes a curvature radius of an object side surface of the fourth lens;
   R8 denotes a curvature radius of the image side surface of the fourth lens; and
   d7 denotes an on-axis thickness of the fourth lens.

2. The camera optical lens as described in claim 1, wherein the object side surface of the first lens is convex in a paraxial region, the image side surface of the first lens is concave in the paraxial region, and the camera optical lens satisfies following conditions:

$0.48 \leq f1/f \leq 1.61$;

$-3.43 \leq (R1+R2)/(R1-R2) \leq -1.01$; and $0.07 \leq d1/TTL \leq 0.22$, where
   f denotes a focal length of the camera optical lens;
   f1 denotes a focal length of the first lens;
   d1 denotes an on-axis thickness of the first lens; and
   TTL denotes a total optical length from the object side surface of the first lens to an image plane of the camera optical lens along an optic axis.

3. The camera optical lens as described in claim 2, further satisfying following conditions:

$0.77 \leq f1/f \leq 1.29$;

$-2.14 \leq (R1+R2)/(R1-R2) \leq -1.26$; and $0.11 \leq d1/TTL \leq 0.17$.

4. The camera optical lens as described in claim 1, wherein the object side surface of the second lens is convex in a paraxial region, the image side surface of the second lens is concave in the paraxial region, and the camera optical lens satisfies following conditions:

$-7.03 \leq f2/f \leq -1.50$;

$1.09 \leq (R3+R4)/(R3-R4) \leq -10.69$; and $0.02 \leq d3/TTL \leq 0.05$, where
   f denotes a focal length of the camera optical lens;
   f2 denotes a focal length of the second lens;
   d3 denotes an on-axis thickness of the second lens; and
   TTL denotes a total optical length from the object side surface of the first lens to an image plane of the camera optical lens along an optic axis.

5. The camera optical lens as described in claim 4, further satisfying following conditions:

$-4.39 \leq f2/f \leq -1.87$ $1.74 \leq (R3+R4)/(R3-R4) \leq 8.55$; and $0.03 \leq d3/TTL \leq 0.04$.

6. The camera optical lens as described in claim 1, wherein the third lens comprises an image side surface being concave in a paraxial region, and the camera optical lens satisfies following conditions:

$-8.28 \leq f3/f \leq -1.95$ $0.46 \leq (R5+R6)/(R5-R6) \leq 4.16$; and $0.02 \leq d5/TTL \leq 0.08$, where
   f denotes a focal length of the camera optical lens;
   f3 denotes a focal length of the third lens; and
   R5 denotes a curvature radius of an object side surface of the third lens;
   R6 denotes a curvature radius of the image side surface of the third lens;
   d5 denotes an on-axis thickness of the third lens; and
   TTL denotes a total optical length from the object side surface of the first lens to an image plane of the camera optical lens along an optic axis.

7. The camera optical lens as described in claim 6, further satisfying following conditions:

$-5.18 \leq f3/f \leq -2.44$;

$0.74 \leq (R5+R6)/(R5-R6) \leq 3.33$; and $0.04 \leq d5/TTL \leq 0.07$.

8. The camera optical lens as described in claim 1, wherein the object side surface of the fourth lens is convex in a paraxial region, the fourth lens further comprises an image side surface being convex in the paraxial region, and the camera optical lens satisfies following conditions:

$1.28 \leq f4/f \leq 4.26$ $0.05 \leq d7/TTL \leq 0.17$, where
   f denotes a focal length of the camera optical lens;
   f4 denotes a focal length of the fourth lens; and
   TTL denotes a total optical length from the object side surface of the first lens to an image plane of the camera optical lens along an optic axis.

9. The camera optical lens as described in claim 8, further satisfying following conditions:

$2.00 \leq f4/f \leq 3.41$;

$-0.05 \leq (R7+R8)/(R7-R8) \leq 0.35$; and $0.08 \leq d7/TTL \leq 0.13$.

10. The camera optical lens as described in claim 1, wherein the fifth lens comprises an object side surface being convex in a paraxial region and an image side surface being concave in the paraxial region, and the camera optical lens satisfies following conditions:

$-25.17 \leq f5/f \leq -3.00$;

$1.00 \leq (R9+R10)/(R9-R10) \leq 13.51$; and $0.03 \leq d9/TTL \leq 0.10$, where f denotes a focal length of the camera optical lens;
f5 denotes a focal length of the fifth lens;
R9 denotes a curvature radius of the object side surface of the fifth lens;
R10 denotes a curvature radius of the image side surface of the fifth lens;
d9 denotes an on-axis thickness of the fifth lens; and
TTL denotes a total optical length from the object side surface of the first lens to an image plane of the camera optical lens along an optic axis.

11. The camera optical lens as described in claim 10, further satisfying following conditions:

$-15.73 \leq f5/f \leq -3.50$;

$2.00 \leq (R9+R10)/(R9-R10) \leq 10.80$; and $0.04 \leq d9/TTL \leq 0.08$.

12. The camera optical lens as described in claim 1, wherein the sixth lens comprises an object side surface being convex in a paraxial region and an image side surface being concave in the paraxial region, and the camera optical lens satisfies following conditions:

$0.49 \leq f6/f \leq 1.58$;

$-4.18 \leq (R11+R12)/(R11-R12) \leq -1.11$; and $0.03 \leq d11/TTL \leq 0.11$, where f denotes a focal length of the camera optical lens;
f6 denotes a focal length of the sixth lens;
R11 denotes a curvature radius of the object side surface of the sixth lens;
R12 denotes a curvature radius of the image side surface of the sixth lens;
d11 denotes an on-axis thickness of the sixth lens; and
TTL denotes a total optical length from the object side surface of the first lens to an image plane of the camera optical lens along an optic axis.

13. The camera optical lens as described in claim 12, further satisfying following conditions:

$0.78 \leq f6/f \leq 1.27$;

$-3.00 \leq (R11+R12)/(R11-R12) \leq -1.38$; and $0.05 \leq d11/TTL \leq 0.09$.

14. The camera optical lens as described in claim 1, wherein the seventh lens comprises an object side surface being concave in a paraxial region and an image side surface being concave in the paraxial region, and the camera optical lens satisfies following conditions:

$-1.60 \leq f7/f \leq -0.49$;

$0.08 \leq (R13+R14)/(R13-R14) \leq 0.75$; and $0.03 \leq d13/TTL \leq 0.13$, where f denotes a focal length of the camera optical lens;
f7 denotes a focal length of the seventh lens;
R13 denotes a curvature radius of the object side surface of the seventh lens;
R14 denotes a curvature radius of the image side surface of the seventh lens;
d13 denotes an on-axis thickness of the seventh lens; and
TTL denotes a total optical length from the object side surface of the first lens to an image plane of the camera optical lens along an optic axis.

15. The camera optical lens as described in claim 14, further satisfying following conditions:

$-1.00 \leq f7/f \leq -0.61$;

$0.10 \leq (R13+R14)/(R13-R14) \leq 0.60$; and $0.05 \leq d13/TTL \leq 0.10$.

16. The camera optical lens as described in claim 1, wherein an F number of the camera optical lens is smaller than or equal to 1.70.

17. The camera optical lens as described in claim 16, wherein the F number of the camera optical lens is smaller than or equal to 1.65.

18. The camera optical lens as described in claim 1, wherein a total optical length TTL from the object side surface of the first lens to an image plane of the camera optical lens along an optic axis is smaller than or equal to 7.87 mm.

19. The camera optical lens as described in claim 18, wherein the total optical length TTL is smaller than or equal to 7.51 mm.

* * * * *